(12) United States Patent
Sun (10) Patent No.: US 10,365,693 B2
(45) Date of Patent: Jul. 30, 2019

(54) FLEXIBLE DISPLAY PANEL FOR FINGERPRINT RECOGNITION, DISPLAY DEVICE AND FINGERPRINT RECOGNITION METHOD

(71) Applicant: BOE TECHNOLOGY GROUP CO., LTD., Beijing (CN)

(72) Inventor: Yanliu Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/031,450

(22) Filed: Jul. 10, 2018

(65) Prior Publication Data

US 2019/0187756 A1 Jun. 20, 2019

(30) Foreign Application Priority Data

Dec. 14, 2017 (CN) .......................... 2017 1 1338823

(51) Int. Cl.
*H05K 1/02* (2006.01)
*G06F 1/16* (2006.01)
*G06K 9/00* (2006.01)

(52) U.S. Cl.
CPC ....... *G06F 1/1652* (2013.01); *G06K 9/00053* (2013.01); *G06K 9/00087* (2013.01)

(58) Field of Classification Search
CPC ............ G06K 9/00087; G06K 9/00053; G06F 1/1652
USPC ......................................................... 361/749
See application file for complete search history.

(56) References Cited

U.S. PATENT DOCUMENTS

| | | | |
|---|---|---|---|
| 2015/0187980 A1* | 7/2015 | Yamamoto | G06F 1/00 250/552 |
| 2018/0114051 A1* | 4/2018 | Long | G06K 9/0004 |
| 2018/0165496 A1* | 6/2018 | Cheng | G02F 1/1333 |

* cited by examiner

*Primary Examiner* — Tremesha S Willis
(74) *Attorney, Agent, or Firm* — Foley & Lardner LLP (57) ABSTRACT

This disclosure provides a flexible display panel for fingerprint recognition, a display device and a fingerprint recognition method. The flexible display panel for fingerprint recognition includes a flexible substrate base plate and a cover plate provided opposite to each other to form a cell, wherein the flexible substrate base plate includes a first flexible layer; a light shielding layer disposed below the first flexible layer, wherein the light shielding layer has a fingerprint recognition area, and the light shielding layer at the fingerprint recognition area has a plurality of imaging holes arranged in an array; a fingerprint acquisition element disposed on a side of the flexible substrate base plate away from the cover plate and opposite to the fingerprint recognition area; and a functional film layer disposed between the flexible substrate base plate and the cover plate.

20 Claims, 5 Drawing Sheets

FLEXIBLE DISPLAY PANEL FOR FINGERPRINT RECOGNITION, DISPLAY DEVICE AND FINGERPRINT RECOGNITION METHOD

CROSS REFERENCE

This application is based upon and claims priority to Chinese Patent Application No. 201711338823.5, filed on Dec. 14, 2017, the entire contents thereof are incorporated herein by reference.

TECHNICAL FIELD

The present disclosure relates to a display technique field, and in particular, to a flexible display panel for fingerprint recognition, a display device, and a fingerprint recognition method.

BACKGROUND

With increasing development of electronic technology, a fingerprint recognition is widely used in a display screen of the electronic devices, such as a mobile phone, a personal digital assistant, a computer.

One of research studies in the display field is to embed the fingerprint recognition device in the display area, which may save a front display area of the mobile phone or the mobile device to improve the user's experience. The existing flexible display panel for fingerprint recognition presents a poor balance between flexibility and display effect.

SUMMARY

According to some arrangements of the present disclosure, a flexible display panel for fingerprint recognition includes a flexible substrate base plate, a cover plate, a light shielding layer, a fingerprint acquisition element and a functional film layer. The flexible substrate base plate and the cover plate are provided opposite to each other to form a cell. The flexible substrate base plate includes a first flexible layer. The light shielding layer is disposed below the first flexible layer. The light shielding layer has a fingerprint recognition area, and the light shielding layer at the fingerprint recognition area has a plurality of imaging holes arranged in an array. The fingerprint acquisition element is disposed on a side of the flexible substrate base plate away from the cover plate and is opposite to the fingerprint recognition area. The functional film layer is disposed between the flexible substrate base plate and the cover plate.

According to one implementation of the present disclosure, the flexible substrate base plate further includes a second flexible layer, and the light shielding layer is positioned between the first flexible layer and the second flexible layer.

According to one implementation of the present disclosure, the functional film layer includes a light-emitting layer.

According to one implementation of the present disclosure, the functional film layer further includes a touch film layer, and/or a polarizing film layer.

According to one implementation of the present disclosure, the light shielding layer has a thickness of less than 500 nm.

According to one implementation of the present disclosure, the first flexible layer has a thickness of 5 μm to 10 μm.

According to one implementation of the present disclosure, the imaging hole has an aperture of 5 μm to 20 μm.

According to one implementation of the present disclosure, a center distance $$d \geq \frac{3h_d D}{2h_t} + D,$$

between the adjacent imaging holes is where d is the center distance between the adjacent imaging holes, D is a diameter of the imaging hole, $h_d$ is a distance between the light shielding layer and the fingerprint acquisition element, and $h_t$ is a thickness of the light shielding layer.

According to one implementation of the present disclosure, the light shielding layer includes a metal light shielding layer, a black resin light shielding layer, or a composite light shielding layer.

According to one implementation of the present disclosure, the fingerprint acquisition element comprises an inductive coupling element, a complementary metal oxide semiconductor, or a flexible light sensor.

According to one implementation of the present disclosure, a material of the cover plate is at least one of a textured transparent ceramic, a textured microcrystalline glass, a textured low-temperature coating resin, an amorphized coating resin.

According to one implementation of the present disclosure, each of the first flexible layer and the second flexible layer has a thickness of 5 μm to 10 μm.

According to one implementation of the present disclosure, the flexible display panel further includes a carrier base plate, and the carrier base plate is positioned at a bottom of the flexible substrate base plate.

According to one aspect of the present disclosure, a fingerprint recognition method for a flexible display panel, which is applied to the flexible display panel for fingerprint recognition, includes partitioning finger fingerprints correspondingly according to a plurality of imaging holes in the fingerprint recognition area, and overlapping fingerprint partition edges corresponding to the adjacent imaging holes;

forming fingerprint partition images on the corresponding fingerprint acquisition element through respective imaging holes of the fingerprint recognition area;

splicing and integrating the adjacent fingerprint partition images with edges overlapped;

outputting a complete fingerprint image.

According to one implementation of the present disclosure, each fingerprint partition area occupies at least three pixels of the flexible display panel for fingerprint recognition.

According to one aspect of the present disclosure, an arrangement of the present disclosure further provides a display device, including aforesaid flexible display panel for fingerprint recognition. The flexible display panel includes: a flexible substrate base plate, a cover plate, a light shielding layer, a fingerprint acquisition layer and a functional film layer. The flexible substrate base plate and the cover plate are provided opposite to each other to form a cell. The flexible substrate base plate includes a first flexible layer. The light shielding layer is disposed below the first flexible layer. The light shielding layer has a fingerprint recognition area, and the light shielding layer at the fingerprint recognition area has a plurality of imaging holes arranged in an array. The fingerprint acquisition element is disposed on a side of the flexible substrate base plate away from the cover plate and is opposite to the fingerprint recognition area. The functional film layer is disposed between the flexible substrate base plate and the cover plate.

DETAILED DESCRIPTION

The technical solution in the arrangements of the present disclosure will be further described clearly and completely with reference to the drawings in the arrangements of the present disclosure. Obviously, the arrangements merely refer to a part of the arrangements of the present disclosure but not all of the arrangements. Based on the arrangements of the present disclosure, all other arrangements obtained by those skilled in the art without making creative efforts shall fall within the protection scope of the present disclosure.

Figure 1:
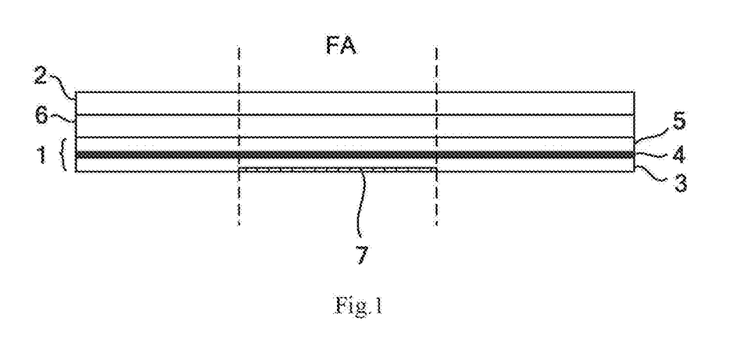
FIG. 1 is a schematic view of a sectional structure of a flexible display panel for fingerprint recognition in one arrangement of the present disclosure.

According to one aspect of the present disclosure, a flexible display panel for fingerprint recognition as provided by an arrangement of the present disclosure includes a flexible substrate base plate 1, a cover plate 2, a light shielding layer 4, a fingerprint acquisition element 7, and a functional film layer 6. The flexible substrate base plate 1 and the cover plate 2 are provided opposite to each other to form a cell. The flexible substrate base plate 1 includes a first flexible layer 5. The light shielding layer 4 is disposed under the first flexible layer 5. The light shielding layer 4 has a fingerprint recognition area. The light shielding layer 4 at the fingerprint recognition area has a plurality of imaging holes 41 arrange in an array. The fingerprint acquisition element 7 is disposed on a side of the flexible substrate base plate 1 away from the cover plate 2, and is opposite to the fingerprint recognition area. The functional film layer 6 is disposed between the flexible substrate base plate 1 and the cover plate 2.

Figure 2:
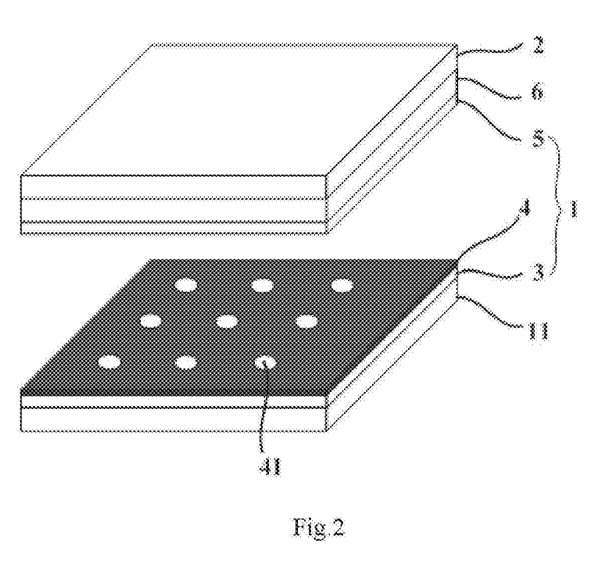
FIG. 2 is a schematic structural view of a fingerprint recognition area of the flexible display panel for fingerprint recognition in one arrangement of the present disclosure.

The light shielding layer 4 has a fingerprint recognition area FA, and the light shielding layer 4 at the fingerprint recognition area FA has a plurality of imaging holes 41 arranged in an array. The fingerprint acquisition element 7 is disposed on a side of the flexible substrate base plate 1 away from the cover plate 2, and is opposite to the fingerprint recognition area FA.

In this arrangement, the first flexible layer 5 is provided to increase a distance between the light shielding layer 4 and a light-emitting element in the functional film layer 6, so as to reduce influence of the light shielding layer 4 on light-emitting characteristics of the light-emitting element, and improve a display effect of the flexible display panel. At the same time, the first flexible layer 5 may further improve flexibility, and thereby improving the display effect of the flexible panel in a bent state.

In one arrangement, as shown in FIG. 1 and FIG. 2, different from the aforesaid arrangement, the flexible substrate base plate 1 further includes a second flexible layer 3. The light shielding layer 4 is positioned between the first flexible layer 5 and the second flexible layer 3, that is, the second flexible layer 3 is positioned below the light shielding layer 4. Herein, a direction of approaching to the flexible substrate base plate 1 from the cover plate 2 is a downward direction.

In one arrangement, the light shielding layer 4 of the flexible display panel for fingerprint recognition is disposed between the first flexible layer 5 and the second flexible layer 3, to increase the distance between the light shielding layer 4 and the light-emitting element in the functional film layer 6, so as to reduce the influence of the light shielding layer 4 on the light-emitting characteristics of the light-emitting element and improve the display effect of the flexible display panel. Meanwhile, the flexible layers provided on both sides of the light shielding layer 4 may further increase the flexibility, and thereby improving the display effect of the flexible display panel in a bent state.

In one arrangement, the light shielding layer 4 includes a medium having a light absorbent property, such as a metal light shielding layer, a black resin light shielding layer, or a composite light shielding layer, which is not specifically limited in the present disclosure, but may select the material in accordance with the requirements according to the actual production and use requirements. The material of the cover plate 2 in the arrangement of the present disclosure includes a textured transparent ceramic, a textured microcrystalline glass, a textured low-temperature coating resin, an amorphized coating resin, etc., which are not specifically limited in this arrangement. However, for considering the factors such as process and cost, the cover plate 2 made of microcrystalline glass may be optionally used. The material for forming the first flexible layer 5 and the second flexible layer 3 in the arrangement of the present disclosure includes at least one of polyimide, polycarbonate, polyethylene, polyethylene terephthalate and polyacrylate. The flexible substrate base plate 1 is flexible, bendable and translucent, which is not specifically limited in the present disclosure, but may select the material in accordance with the requirements according to the actual production and use requirements. The arrangement of the present disclosure does not specifically limit the deposition process of each structural layer of the flexible display panel. In an actual process of producing the flexible substrate base plate 1, as shown in FIG. 2, the flexible substrate base plate 1 including the first flexible layer 5 and the second flexible layer 3 stacked with each other requires a carrier base plate 11. The carrier base plate 11 is generally made of a rigid glass. A second flexible layer 3, a light shielding layer 4, and a first flexible layer 5 are formed layer by layer on the carrier base plate 11 made of rigid glass.

In one arrangement, the fingerprint acquisition element described herein includes an inductive coupling element, a complementary metal oxide semiconductor, or a flexible light sensor, which is not limited specifically in the present disclosure, and may select the materials in accordance with the requirements according to actual production and use requirements. And in one arrangement, there is no specific limitation to the specific number and structure of the fingerprint acquisition elements, it is possible to provide a single fingerprint acquisition element, that is, all the imaging holes 41 are correspondingly imaged on the fingerprint acquisition element, or it is possible to provide a fingerprint acquisition array formed by integrating a plurality of fingerprint acquisition elements, that is, each of the imaging holes 41 or several imaging holes 41 are imaged corresponding to one fingerprint acquisition unit, and the structure in accordance with the fingerprint acquisition element may be selected according to actual production and use requirements.

In one arrangement, the functional film layer 6 of the flexible display panel includes a light-emitting layer, and further includes a touch film layer and/or a polarizing film layer, which is not limited specifically in the present disclosure, but may be selected according to design or function requirements. The polarizing film layer and the light-emitting layer belong to the display functional film layer 6 of the display panel, which may provide a better display effect. The display panel with the touch film layer may provide more accurate and sensitive recognition feedback when performing fingerprint recognition.

In one arrangement, in the flexible display panel for fingerprint recognition, the light shielding layer 4 has a thickness of less than 500 nm, and each of the first flexible layer 5 and the second flexible layer 3 has a thicknesses of 5 to 10 μm, which is only one arrangement of the present disclosure but does not mean the specific limitation to the thickness of the light shielding layer 4 and the thicknesses of the first flexible layer 5 and the second flexible layer 3. It is found from a large number of experimental verifications that the imaging holes 41 formed on the light shielding layer 4 have a mesh number between 200 μm and 1000 μm and are uniformly arranged, so that the first flexible layer 5 and the second flexible layer 3 in the formation process are connected through the imaging holes 41 but without a risk of delamination. When it is required that the thickness of the light shielding layer 4 is less than 500 nm, and the thickness of the first flexible layer 5 and the second flexible layer 3 is 5-10 μm, the flexible material of the flexible substrate base plate 1 may completely fill breaks or voids formed at the imaging holes 41, to ensure planarization of the surface of the first flexible layer 5 in the upper layer, so as to ensure the display effect of the flexible display panel.

Meanwhile, in one arrangement, the flexible display panel realizes the fingerprint recognition function according to a pinhole imaging principle of the imaging hole 41. In order to improve accuracy of the fingerprint recognition, an aperture of the imaging hole 41 needs to be as small as possible, such as 5um, but if the aperture of the imaging hole 41 is too small, it is easy to cause light intensity on the surface of the fingerprint acquisition device too low, such that image data will be extracted difficulty. Thus, the aperture of the imaging hole 41 may be 5-20 μm according to the actual display panel structure and the employed manner of stacking the film layers, in combination with light sensitivity of the fingerprint acquisition device.

Figure 3:
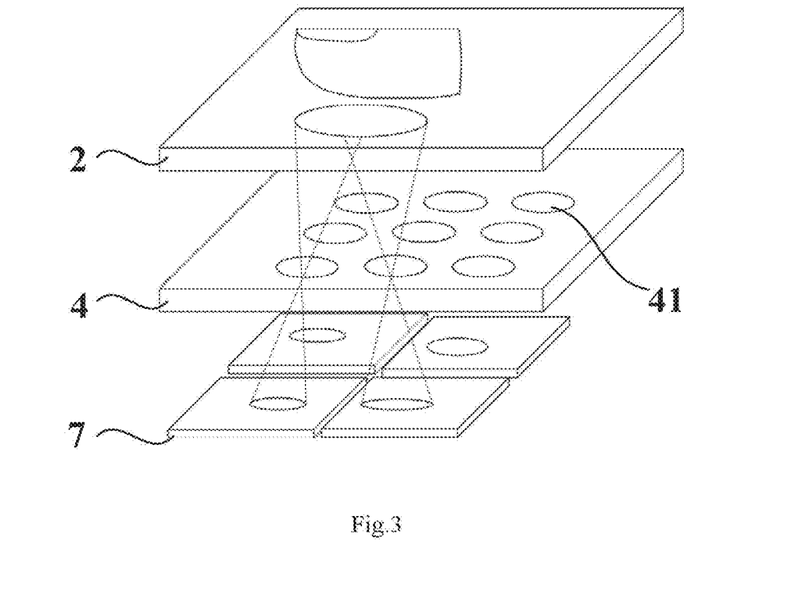
FIG. 3 is a schematic view of a fingerprint imaging process of the flexible display panel for fingerprint recognition in one arrangement of the present disclosure.
Figure 4:
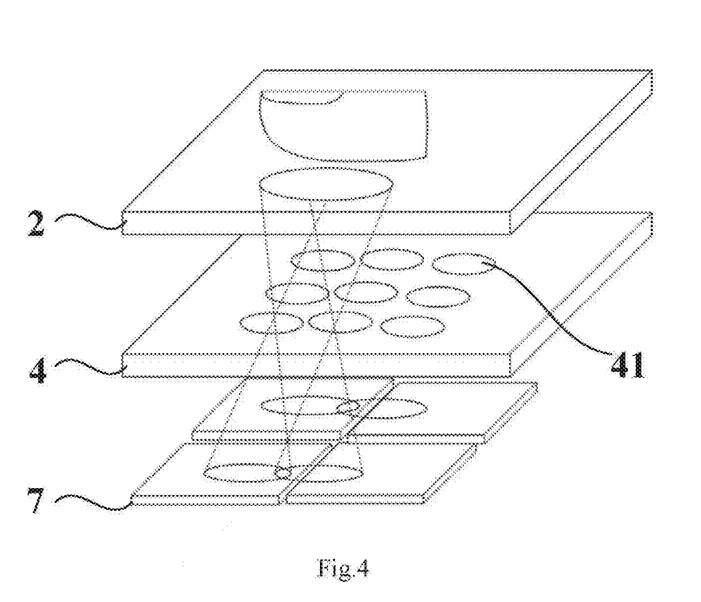
FIG. 4 is a schematic view of a fingerprint imaging process of the flexible display panel for fingerprint recognition in another arrangement of the present disclosure.

In one arrangement, according to a further aspect, with reference to the fingerprint recognition imaging process of the flexible display panel of the present disclosure in FIG. 3 and FIG. 4, a center distance of the adjacent imaging holes 41 of the flexible display $$d \geq \frac{3h_d D}{2h_t} + D,$$

panel is where d is the center distance between the two adjacent imaging holes 41; D is a diameter of the imaging hole 41; $h_d$ is a distance between the light shielding layer 4 and the fingerprint acquisition element; and $h_t$ is a thickness of the light shielding layer 4. The arrangement of the center distance may avoid an overlapping of the fingerprint images formed by the different imaging holes 41 in FIG. 4. Such image overlapping situation may cause great difficulties for extracting and processing of the later fingerprint images, so that is required to regulate the distance of the imaging hole array.

Figure 5:
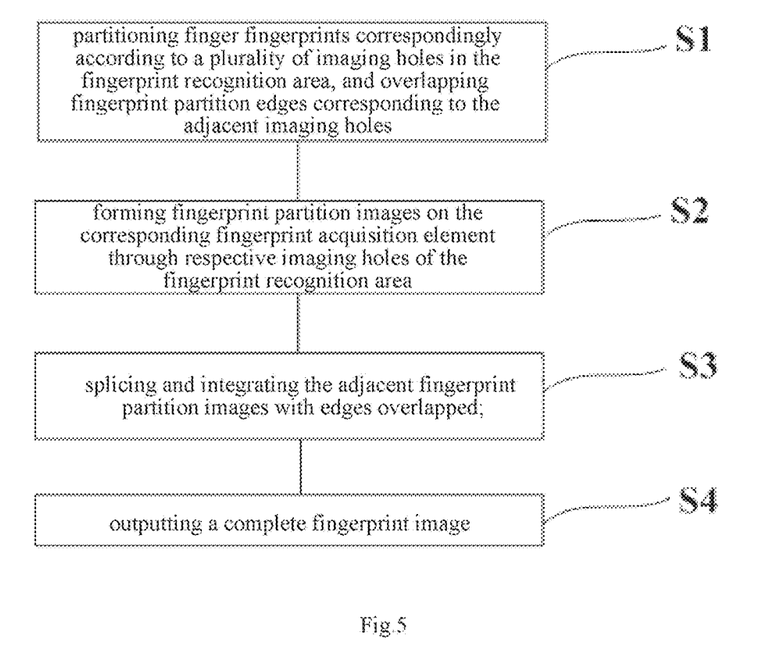
FIG. 5 is a schematic flowchart of a fingerprint recognition method of the flexible display panel for fingerprint recognition in one arrangement of the present disclosure.

In addition, according to one aspect of the present disclosure, a fingerprint recognition method for a flexible display panel is further provided to be applied to the above-mentioned flexible display panel for fingerprint recognition, as shown in FIG. 5, including:

at 51, partitioning finger fingerprints correspondingly according to a plurality of imaging holes 41 in the fingerprint recognition area, and overlapping fingerprint partition edges corresponding to the adjacent imaging holes 41;

at S2: forming fingerprint partition images on the corresponding fingerprint acquisition element through respective imaging holes 41 of the fingerprint recognition area;

at S3: splicing and integrating the adjacent fingerprint partition images with edges overlapped; and at S4: outputting a complete fingerprint image.

The fingerprint recognition method for the flexible display panel according to the arrangement of the present disclosure is described as that the fingerprints are segmented to be imaged, and the segmented fingerprint partition images are extracted, spliced, and integrated, to effectively improve image quality of the edge portion of the finger so that a clear and complete fingerprint image may be obtained, so as to improve success rate of fingerprint recognition.

In one arrangement, each fingerprint partition area occupies at least three pixels of the flexible display panel for fingerprint recognition, thereby improving accuracy of fingerprint recognition.

An arrangement of the present disclosure further provides a display device including aforesaid flexible display panel for fingerprint recognition. The flexible display panel for fingerprint recognition includes a flexible substrate base plate 1, a cover plate 2, a light shielding layer 4, a fingerprint acquisition element 7, and a functional film layer 6. The flexible substrate base plate 1 and the cover plate 2 are provided opposite to each other to form a cell. The flexible substrate base plate 1 includes a first flexible layer 5. The light shielding layer 4 is disposed under the first flexible layer 5. The light shielding layer 4 has a fingerprint recognition area. The light shielding layer 4 at the fingerprint recognition area has a plurality of imaging holes 41 arrange in an array. The fingerprint acquisition element 7 is disposed on a side of the flexible substrate base plate 1 away from the cover plate 2, and is opposite to the fingerprint recognition area. The functional film layer 6 is disposed between the flexible substrate base plate 1 and the cover plate 2. The light shielding layer 4 has a fingerprint recognition area FA, and the light shielding layer 4 at the fingerprint recognition area FA has a plurality of imaging holes 41 arranged in an array. The fingerprint acquisition element 7 is disposed on a side of the flexible substrate base plate 1 away from the cover plate 2, and is opposite to the fingerprint recognition area FA.

In one arrangement, different from the aforesaid arrangement, the flexible substrate base plate 1 further includes a second flexible layer 3. The light shielding layer 4 is positioned between the first flexible layer 5 and the second flexible layer 3, that is, the second flexible layer 3 is positioned below the light shielding layer 4. Herein, a direction of approaching to the flexible substrate base plate 1 from the cover plate 2 is a downward direction.

The display device of the present disclosure includes the aforesaid flexible display panel for fingerprint recognition. The flexible layers are provided on both sides of the light shielding layer 4 to increase the distance between the light shielding layer 4 and the light-emitting element in the functional film layer 6, so as to reduce the influence of the light shielding layer 4 on the light-emitting characteristics of the light-emitting element and improve the display effect of the flexible display panel. Meanwhile, the flexible layers provided on both sides of the light shielding layer 4 may further increase the flexibility, and thereby improving the display effect of the flexible display panel in a bent state.

It is obvious to those skilled in the art that various modifications and variations may be made to the present disclosure without departing from the spirit and scope of the disclosure. Thus, if these modifications and variations of the disclosure fall within the scope of the claims and their equivalents of the present disclosure, the present disclosure also intends to include these modifications and variations therein.

What is claimed is:

1. A flexible display panel for fingerprint recognition, comprising:
   a flexible substrate base plate and a cover plate provided opposite to each other to form a cell, wherein the flexible substrate base plate comprises a first flexible layer;
   a light shielding layer disposed below the first flexible layer, wherein the light shielding layer has a fingerprint recognition area, and the light shielding layer at the fingerprint recognition area has a plurality of imaging holes arranged in an array;
   a fingerprint acquisition element disposed on a side of the flexible substrate base plate away from the cover plate and is opposite to the fingerprint recognition area;
   a functional film layer disposed between the flexible substrate base plate and the cover plate.

2. The flexible display panel for fingerprint recognition according to claim 1, wherein the flexible substrate base plate further comprises a second flexible layer, and the light shielding layer is positioned between the first flexible layer and the second flexible layer.

3. The flexible display panel for fingerprint recognition according to claim 1, wherein the functional film layer includes a light-emitting layer.

4. The flexible display panel for fingerprint recognition according to claim 3, wherein the functional film layer further comprises a touch film layer, and/or a polarizing film layer.

5. The flexible display panel for fingerprint recognition according to claim 1, wherein the light shielding layer has a thickness of less than 500 nm.

6. The flexible display panel for fingerprint recognition according to claim 5, wherein the first flexible layer has a thickness of 5 μm to 10 μm.

7. The flexible display panel for fingerprint recognition according to claim 6, wherein one of the plurality of imaging holes has an aperture of 5 μm to 20 μm.

8. The flexible display panel for fingerprint recognition according to claim 7, wherein a center distance between adjacent imaging holes of the plurality of imaging holes is $$d \geq \frac{3h_d D}{2h_t} + D,$$

wherein d is the center distance between the adjacent imaging holes, D is a diameter of one of the adjacent imaging holes, $h_d$ is a distance between the light shielding layer and the fingerprint acquisition element, and $h_t$ is a thickness of the light shielding layer.

9. The flexible display panel for fingerprint recognition according to claim 1, wherein the light shielding layer comprises a metal light shielding layer, a black resin light shielding layer, or a composite light shielding layer.

10. The flexible display panel for fingerprint recognition according to claim 1, wherein the fingerprint acquisition element comprises an inductive coupling element, a complementary metal oxide semiconductor, or a flexible light sensor.

11. The flexible display panel for fingerprint recognition according to claim 2, wherein the functional film layer includes a light-emitting layer.

12. The flexible display panel for fingerprint recognition according to claim 11, wherein the functional film layer further comprises a touch film layer, and/or a polarizing film layer.

13. The flexible display panel for fingerprint recognition according to claim 2, wherein the light shielding layer has a thickness of less than 500 nm.

14. The flexible display panel for fingerprint recognition according to claim 13, wherein each of the first flexible layer and the second flexible layer has a thickness of 5 μm to 10 μm.

15. The flexible display panel for fingerprint recognition according to claim 14, wherein one of the plurality of imaging holes has an aperture of 5 μm to 20 μm.

16. The flexible display panel for fingerprint recognition according to claim 15, wherein a center distance between adjacent imaging holes of the plurality of imaging holes is $$d \geq \frac{3h_d D}{2h_t} + D,$$

wherein d is the center distance between the adjacent imaging holes, D is a diameter of one of the adjacent imaging holes, $h_d$ is a distance between the light shielding layer and the fingerprint acquisition element, and $h_t$ is a thickness of the light shielding layer.

17. The flexible display panel for fingerprint recognition according to claim 1, wherein the flexible display panel further comprises a carrier base plate, and the carrier base plate is positioned at a bottom of the flexible substrate base plate.

18. A fingerprint recognition method for a flexible display panel applied to a flexible display panel for fingerprint recognition, the flexible display panel having a flexible substrate base plate and a cover plate provided opposite to each other to form a cell, the flexible substrate base plate having a first flexible layer, a light shielding layer disposed below the first flexible layer, the light shielding layer having a fingerprint recognition area, and the light shielding layer at the fingerprint recognition area has a plurality of imaging holes arranged in an array, a fingerprint acquisition element disposed on a side of the flexible substrate base plate away from the cover plate and is opposite to the fingerprint recognition area, a functional film layer disposed between the flexible substrate base plate and the cover plate, the method comprising:
   partitioning finger fingerprints correspondingly according to a plurality of imaging holes in the fingerprint recognition area, and overlapping fingerprint partition edges corresponding to the adjacent imaging holes;

forming fingerprint partition images on the corresponding fingerprint acquisition element through respective imaging holes of the fingerprint recognition area;

splicing and integrating the adjacent fingerprint partition images with edges overlapped; and outputting a complete fingerprint image.

19. The fingerprint recognition method according to claim 18, wherein each fingerprint partition area occupies at least three pixels of the flexible display panel for fingerprint recognition.

20. A display device, comprising a flexible display panel, wherein the flexible display panel comprises:

- a flexible substrate base plate and a cover plate provided opposite to each other to form a cell, wherein the flexible substrate base plate comprises a first flexible Layer;
- a light shielding layer disposed below the first flexible layer, wherein the light shielding layer has a fingerprint recognition area, and the light shielding layer at the fingerprint recognition area has a plurality of imaging holes arranged in an array;
- a fingerprint acquisition element disposed on a side of the flexible substrate base plate away from the cover plate and is opposite to the fingerprint recognition area; and
- a functional film layer disposed between the flexible substrate base plate and the cover plate.

* * * * *